H. H. MACOMBER.
PUMP.
APPLICATION FILED AUG. 31, 1914.
1,174,172.
Patented Mar. 7, 1916.
2 SHEETS—SHEET 1.
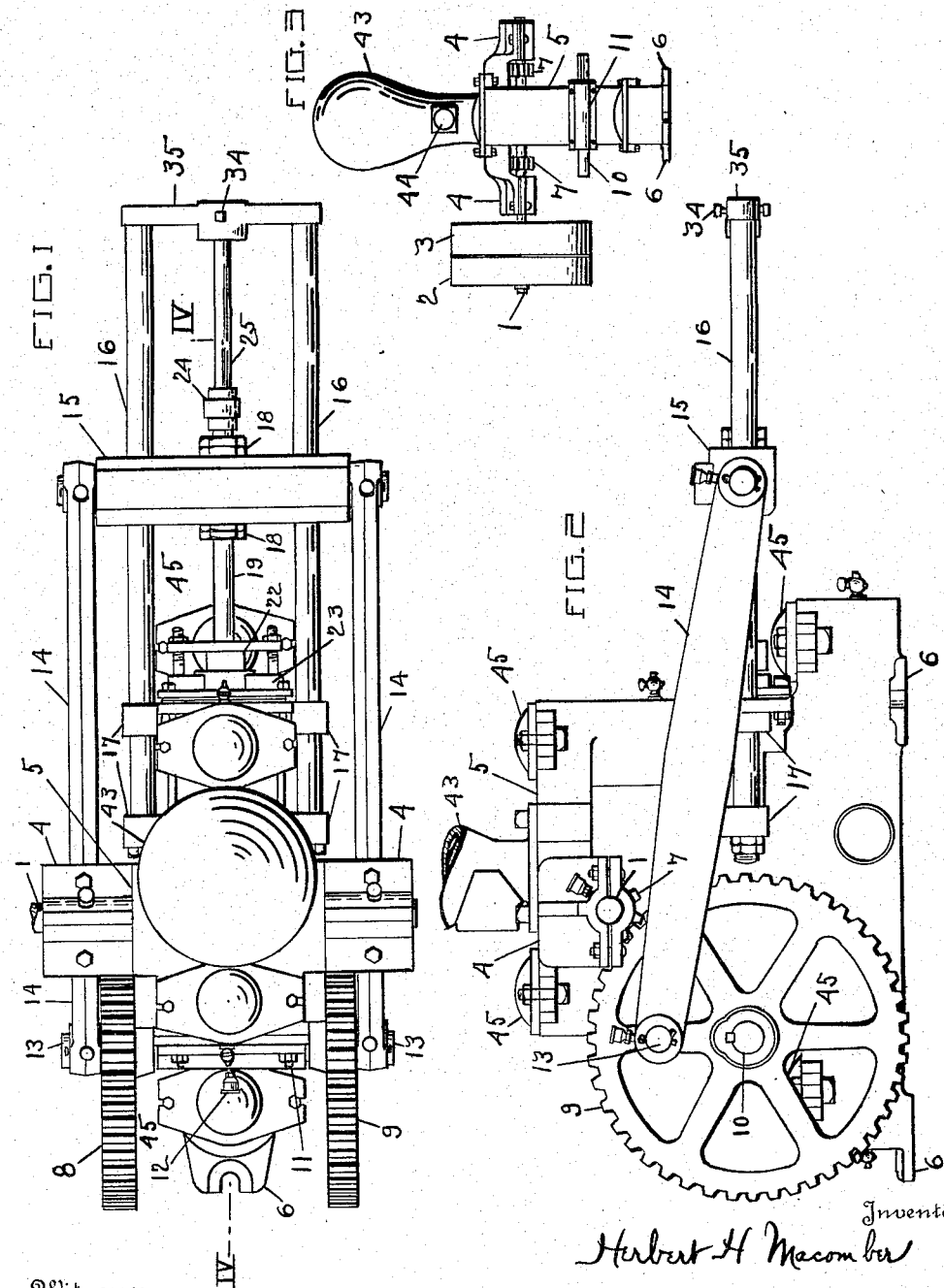

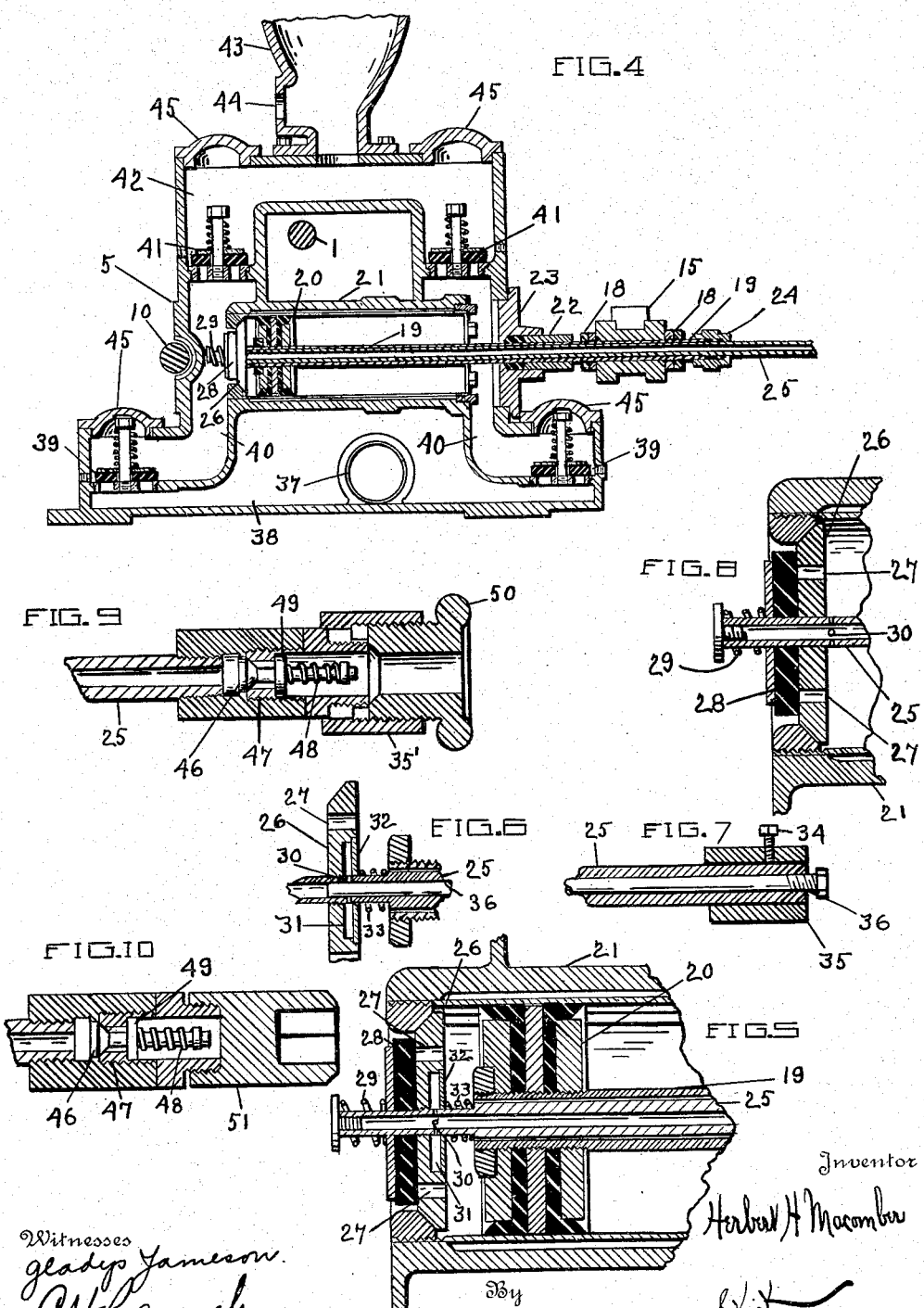

UNITED STATES PATENT OFFICE.

HERBERT H. MACOMBER, OF KENDALLVILLE, INDIANA, ASSIGNOR TO FLINT & WALLING MFG. CO., OF KENDALLVILLE, INDIANA, A CORPORATION OF INDIANA.

PUMP.

1,174,172. Specification of Letters Patent. Patented Mar. 7, 1916.

Application filed August 31, 1914. Serial No. 859,546.

*To all whom it may concern:*

Be it known that I, HERBERT H. MACOMBER, a citizen of the United States of America, and a resident of Kendallville, Noble county, Indiana, have invented a new and useful Pump, of which the following is a specification.

This invention relates to features of piston, cylinder and valve, structure, grouping and operating means.

This invention has utility when embodied in pumps especially pumps which may be used for handling different fluids, as liquid and gas, and features of compact, rigid structure therefor.

Referring to the drawings: Figure 1 is a plan view of an embodiment of the invention in a horizontal power pump; Fig. 2 is a side elevation of the pump of Fig. 1; Fig. 3 is an end elevation, looking from the left in Fig. 1, with large gear wheels removed; Fig. 4 is a section on the line IV—IV, Fig. 1; Fig. 5 is an enlarged detail in section of the primary and secondary pistons in a fragment of the cylinder; Fig. 6 is a fragmentary detail in medial section showing the position of the cut out rod as to the valve in the secondary piston; Fig. 7 is a view of the outer end of the cut out rod when in position in the hollow piston rod, portions being shown in section; Fig. 8 is a fragmentary view of the cylinder with the secondary piston having therein but the outlet or discharge check valve; Fig. 9 is a fragmentary sectional view of the outer end of the hollow piston rod having intake check valve; and Fig. 10 shows the check valve of Fig. 9 cut out.

The pump may be operated by rotating the shaft 1, say through the action of a driving belt shifted from the loose pulley 2 to the pulley 3 fast on the shaft 1. Overhanging from each side of the pump structure is a bearing 4 carried by the main frame 5, provided with the projecting foot brackets 6 for mounting the structure in position by engaging bolts.

Fast on the shaft 1 and inside the overhanging bearings 4 are the pinions 7 in mesh with the gear wheels 8, 9, on the shaft 10. The gear wheel 9 is fast on the shaft 10, while the gear wheel 8 is loose thereon. The shaft 10 is mounted in the bearing 11 extending transversely of the frame 5. There is practically no relative rotation between the wheel 8 and the shaft 10, as the pinions 7 give the wheels 8, 9 similar angular velocity. However, the relative freedom for independent rotation precludes binding in operation and contributes to ease of efficient lubrication through a stationary bearing, as by compression grease cup 12 (Fig. 1).

Eccentrically disposed on the wheels 8, 9, are the wrist pins 13, connected by the links 14 to the reciprocable yoke or cross head 15 traveling on the fixed guide rods 16 mounted by the brackets 17 on the frame 5.

The nuts 18 positively fix the yoke 15 in position as to the hollow piston rod 19 actuating the primary piston 20 in the open ended cylinder 21, disposed in the housing 5. In operation, the piston rod 19 reciprocates through the gland or packing 22 in the removable plate 23 in line with the cylinder which permits assembling of the piston 20 therein.

Adjacent the yoke 15 is the stuffing box 24 packing the joint between the primary hollow piston rod 19 and the inner or secondary hollow piston rod 25 carrying on its inner end the secondary piston 26 having ports 27 therethrough controlled by the check valve 28 normally actuated thereagainst by the spring 29.

Within the secondary piston 26 may be an intake valve, as well as this piston 26 having an outlet valve 28. Openings 30 from the axial passage in the rod 25 communicate with the chamber 31 back of the valve 32 normally held seated by the spring 33. With the set screw 34, in the guide rod holding yoke 35, locking the inner hollow piston rod 25 against travel, the secondary piston 26 is locked in one end of the cylinder 21 to serve as a cylinder head, and instead of the primary and secondary pistons traveling in unison to work as a simple double acting pump, one side of the piston 20 may handle a fluid, as water, and the other side a different fluid, as air, the pump thus being changed from handling a single or common fluid or liquid, to one handling different fluids, or serving to mix two substances, which feature has especial utility in hydropneumatic outfits, enabling storage tanks to supply water to positions elevated above the tanks even though the pump may be idle, the expansible air furnishing the water pressure. To cut this mixing operation, or make the pump run as a double acting water pump, the rod 36 may be inserted in the hollow piston rod 25, to close the openings 30 leading to the valve 32. Loosening of the set screw 34, will then result in the secondary piston 26 traveling with the primary piston 20.

The fluid handled, as water, may be supplied to the pump through the opening 37 to the receiving chamber 38, from whence on the alternating suction strokes of the pistons the respective inlet check valves 39 are opened to draw the water into the passages 40, which are disposed for continuous, or one general direction travel of the liquid handled. On the compression stroke toward the respective passages 40, the check discharge valves 41 alternately open in the forcing of the water into the common discharge chamber 42 in communication with the air dome 43 having the opening 44 for the pressure line. When air is handled, the left hand intake valve 39 is inactive, and the compressed air passing through the valve 28 goes through the second discharge valve 41 in its travel to the opening 44.

Each of the two inlet valves 39, as well as the two outlet valves 41, is provided with a removable cap thereover. These caps 45 are in position for most convenient access to the respective valves to permit giving them such attention as may be required in operation.

The supply valve for the second or mixing fluid may be disposed outside the cylinder
21. The hollow piston rod 25 may have the check valve 46 held against its seat 47 by the spring 48 acting against the spider 49, until upon suction stroke of the primary piston 20, it is unseated to admit air. The handwheel 50 may serve to lock the rod 25 in position as to the yoke 35' and thereby hold the secondary piston 26 in position as a cylinder head. To cut out this check valve 46, the hand wheel 50, having opening therethrough, is removed, and the cap 51 closed thereover, but leaving the rod 25 free to reciprocate through the yoke 35', as it is free to do when the set screw 34 is loosened when the inside check valve 32 is used.
The disposal of the shaft 10 approximately transverse of the axis of the cylinder 21, brings the wrist pins 13 in the most effective working positions for driving the pistons, while the overhanging bearings 4, stiffen up the driving pinion carrying shaft 1, producing a structure of great strength and most compact.

What is claimed and it is desired to secure by Letters Patent is:

1. A pump frame including a cylinder therein, a piston for the cylinder, a rod for actuating the piston, a pair of links operatively connected to the rod, a pair of relatively rotatable wheels to which the links are eccentrically connected, a pair of driving pinions for the wheels, said links and pinions restricting the relative rotation of the wheels, a driving shaft upon which the pinions are mounted, and a pair of overhanging bearings for the pinions carried by the frame.

2. A double acting pump embodying an open ended cylinder, a primary piston for the cylinder, and a secondary piston movable into position to form a cylinder head for the cylinder as to which the primary piston is independently operable.

3. A pump embodying a cylinder, a primary piston therein, a secondary piston movable into position to form a cylinder head for the cylinder, and supply and discharge valves in communication with the cylinder between the pistons whereby the primary piston may act to pump fluid therefrom.

4. A pump embodying a rotatable driving member, a link therefrom, a cross-head reciprocated by said link, a hollow piston rod engaged by said cross-head, a ported piston engaged by said rod, a cylinder in which said piston is reciprocable, a reservoir in communication with each side of the piston from the cylinder to receive fluid therefrom, and manually controllable means for rendering a piston port inactive.

5. A double acting common fluid handling pump, and manually controllable means for converting the pump into a mixing pump including valve means cutting off the intake of the common fluid from one end of the pump and supplying another fluid thereto.

6. A double acting pump, piston means therein, a single piston rod for actuating said piston means, alternative fluid supply means for one end of the pump, and controllable means for rendering one of said supply means inoperative.

7. A pump embodying a rotatable driving member, a pair of links extending therefrom, a cross-head between the links and reciprocated thereby, a piston rod on which said cross-head is mounted, a piston to which said rod is connected, a cylinder in which said piston is reciprocable, a pump passage providing frame lying between said links and carrying the cylinder, an inlet valve below and beyond each end of the cylinder disposed as to the cylinder in the direction of the reciprocation of said piston, an outlet valve above said cylinder and adjacent each inlet valve and toward the cylinder therefrom, and an upwardly removable cap for each valve.

8. A pump embodying a rotatable driving member, a pair of links extending therefrom, a cross-head between the links and reciprocated thereby, a piston rod on which said cross-head is mounted, a piston to which said rod is connected, a cylinder in which said piston is reciprocable, a pump passage providing frame lying between said links and carrying the cylinder, an inlet valve below and beyond each end of the cylinder disposed as to the cylinder in the direction of the reciprocation of said piston, an outlet valve above said cylinder beyond each end of the cylinder and alined with the inlet valves and having similar upwardly removable valve caps, one for each valve, said caps being alined.

In testimony whereof I affix my signature in the presence of two witnesses.

HERBERT H. MACOMBER.

Witnesses:
JULIUS W. LANG,
R. N. KING.